United States Patent

Knauer

Patent Number: 5,558,952
Date of Patent: Sep. 24, 1996

[54] POCKET SEPARATOR FOR ELECTRIC STORAGE BATTERY PLATES

[75] Inventor: Davis J. Knauer, Kutztown, Pa.

[73] Assignee: East Penn Mfg. Co., Lyon Station, Pa.

[21] Appl. No.: 573,139

[22] Filed: Dec. 15, 1995

[51] Int. Cl.$^6$ ....................................... H01M 2/18
[52] U.S. Cl. ...................... 429/139; 429/143; 429/147; 429/254
[58] Field of Search .................... 429/139, 143, 429/147, 136, 254

[56] References Cited

U.S. PATENT DOCUMENTS

| | | | |
|---|---|---|---|
| 2,465,493 | 3/1949 | Strickhouser et al. | 429/147 |
| 4,619,875 | 10/1986 | Stahura et al. | 429/143 |
| 5,470,676 | 11/1995 | Nakano | 429/139 |

Primary Examiner—John S. Maples
Attorney, Agent, or Firm—Zachary T. Wobensmith, III

[57] ABSTRACT

A pocket separator which contains positive or negative plates in an electric storage battery, which has a closed bottom, left and right sides, and an open top. The pocket is formed of a porous separator sheet, with the facing inner surfaces of the pocket having a plurality of continuous vertical ribs, and a plurality of short, inclined ribs at the side edges, with a plurality of broken vertical ribs in the center, which engage a positive or negative plate in the pocket.

3 Claims, 1 Drawing Sheet

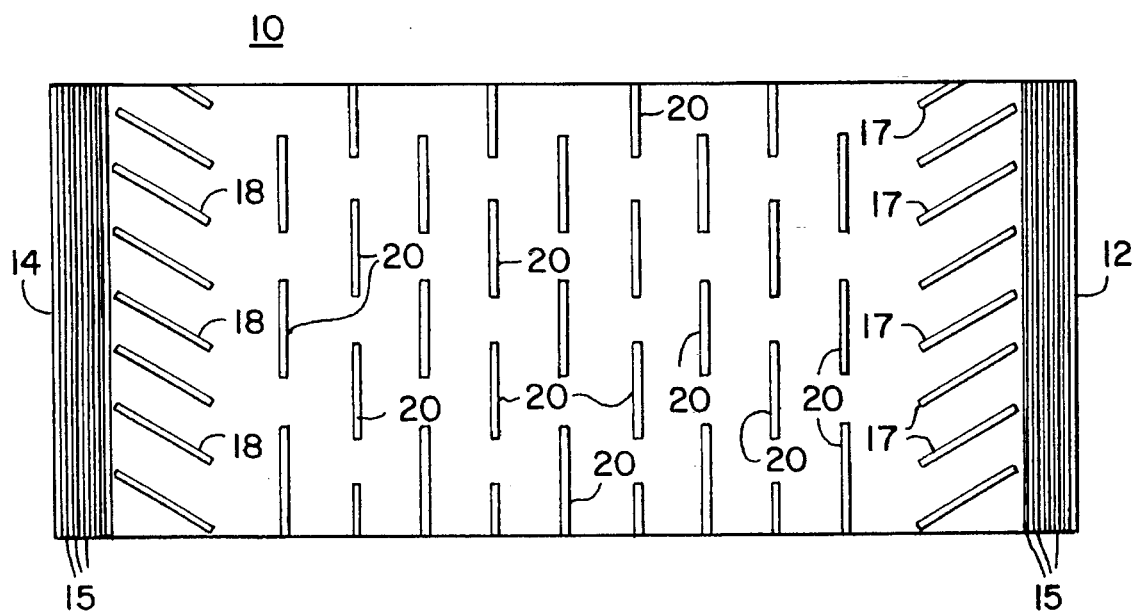
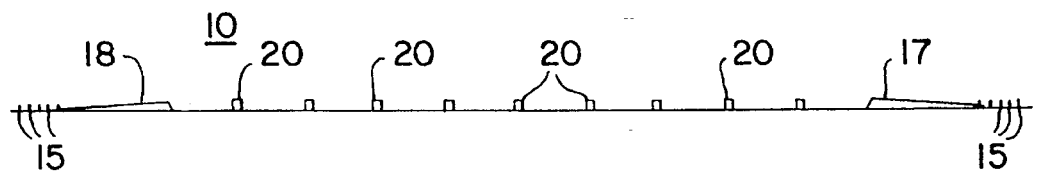
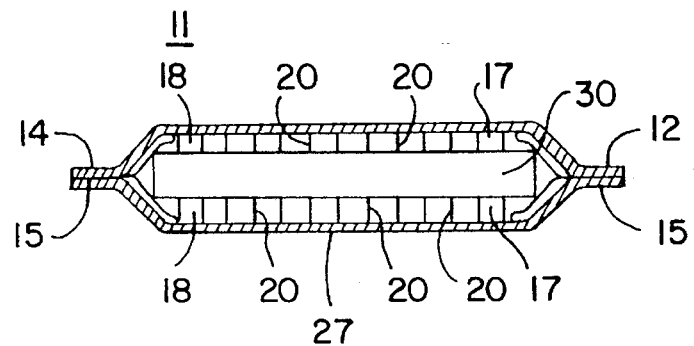

_5,558,952_

POCKET SEPARATOR FOR ELECTRIC STORAGE BATTERY PLATES

BACKGROUND OF THE INVENTION

1. Field of the Invention

This invention relates to a pocket separator for electric storage battery plates.

2. Description of the Prior Art

Various structures have been proposed for pocket separators for electric storage batteries, and particularly for the lead acid type of battery. Such pocket separators are intended to envelop the battery plates for separation of the positive and negative plates. Prior art separator pockets have consisted of a porous sheet of synthetic resin, which was folded and sealed to form a pocket open at the top and closed at the bottom and sides. An electrode plate such as a positive electrode plate for lead acid batteries was inserted into the pocket, with a plurality of pockets and interposed negative plates assembled to form cells.

It has been found that using separator material with smooth inner surfaces which faced the electrode plate were subject to deterioration during use, and to puncturing from warped negative plates which wore holes in the pocket until the plates touched and shorted out the battery.

One solution has been to provide the inner surfaces of the pocket with a plurality of vertical ribs, but this and other rib configurations such as slanted ribs did not allow for free gas flow. It has also been proposed, as shown in the European Patent, to Nakano et al No. EP0541124A2, to provide the separator material which forms the pockets, with a plurality of parallel, vertical widthwise spaced ribs in the middle, and a plurality of intersecting vertically spaced ribs on the widthwise left and right sides, and portions of the facing surfaces, and also at the intersecting front and rear corner edge portions. While this structure is an improvement over prior structures, it is not satisfactory for enveloped negative plates, since during the alignment process, when using enveloped negative plates, the vertical ribs of the separator "catch" the edge of the positive plates causing misalignments and slow production.

The pocket separator of the invention is suitable for both positive and negative plates, does not suffer from the prior art problems and provides positive advantages.

SUMMARY OF THE INVENTION

This invention relates to a pocket separator for retaining positive or negative electrode plates in an electric storage battery, which is open at the top and closed at the sides and bottom.

The pocket separator is formed of a porous sheet that has a plurality of continuous vertical ribs, a plurality of broken inclined ribs at the side edges, and a plurality of broken vertical ribs in the center which engage a positive or negative plate in the pocket.

The principal object of the invention is to provide a pocket separator for a positive or negative electrode plate for an electric storage battery, which is open at the top, closed at the sides and bottom, and formed of a porous sheet material that has a plurality of differently configured ribs on its inner surfaces which engage the plate.

A further object of the invention is to provide a pocket separator which has less electric resistance and higher capacity.

A further object of the invention is to provide a pocket separator that uses less material.

A further object of the invention is to provide a pocket separator which is easy to manufacture and is of consistent and uniform composition.

A further object of the invention is to provide a pocket separator which has some of its ribs at opposed angles which improves the alignment process of the electrode plates.

Other objects and advantageous features of the invention will be apparent from the description and claims.

DESCRIPTION OF THE DRAWINGS

The nature and characteristic features of the invention will be more readily understood from the following description taken in connection with the accompanying drawing, forming part hereof in which:

FIG. 1 is a plan view of a sheet of separator material used to form the pocket separator;

FIG. 2 is a bottom edge view of the sheet of FIG. 1, and

FIG. 3 is a top plan view, in partial section, of an assembled pocket separator of the invention.

It should of course be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment but also technical equivalents which operate and function in substantially the same way to bring about the same result.

Referring now more particularly to FIGS. 1–3 of the drawings, a sheet 10 of material used to construct the pocket separator is therein illustrated.

The sheet 10 is preferably constructed of a synthetic resin such as polyethylene or other suitable material which is compatible with the battery environment where it is to be used. The preferred method of manufacturing the sheet is by extrusion of a continuous length of separator, which has had a pore-forming agent added during the manufacturing process, so that the finished material is porous. The extruded separator material is extruded in a continuous length, which is passed between at least one pair of calendar rolls (not shown), which form rib patterns on the length of material to be described.

The continuous length of extruded material is cut into the sheets 10 which are fabricated into pocket separators 11 as shown in FIG. 3.

The sheets 10 at the right and left side edges 12 and 14 are provided with a plurality of spaced vertical ribs 15, five being illustrated, which run lengthwise along the sheets 10 and are continuous.

Inside of the ribs 15, a plurality of short ribs 17 are provided at the right side 12, and a plurality of short ribs 18 at the left side 14. The ribs 17 and 18 are both angled downwardly at opposing angles, and preferably at an angle of approximately 30 degrees from the horizontal. The opposed angling of the ribs 17 and 18 helps to center the length of sheet material during the extruding process and to produce a uniform product. In addition the opposed angling of the ribs 17 and 18 helps to align the plates during the alignment process and is particularly useful for enveloped negative plates.

The sheets 10 are also provided with a plurality of spaced short vertical ribs 20 which are parallel to ribs 17 and 18 which occupy the middle region of the sheets 10, and are in line, but do not intersect each other.

To form a pocket separator 25 as shown in FIG. 3, a sheet 10 is folded at the middle and joined at the edges 12 and 14 along the vertical ribs 17 and 18 by any suitable means, such as heat sealing, which can be by mechanical or ultrasonic means as desired, thereby providing an outer shell 27 which is part of the pocket separator 25 which is open at the top 26, and closed at the bottom (not shown) and edges 12 and 14.

A plate 30 which can be a positive or negative plate as desired, is inserted into the shell 27 of pocket 25 which envelops the plate 30. The assembled pocket separators 25 have the angled ribs 17 and 18 gripping the edges of the plate 30 for alignment, which permits gas generated by charging the battery to freely flow therebetween and be discharged.

The ribs 20 also contact the plate 30 and help to retain it in the pocket separator 25, and since the ribs are not continuous and spaced apart they also permit gas generated during the charging process to be freely discharged.

To form a cell (not shown), a plurality of pocket separators 25 containing positive or negative plates 30 are alternately stacked together until the desired number is obtained, and which can then be placed in the case (not shown) of a lead acid electric storage battery (not shown) which is further assembled and filled with electrolyte in the conventional manner.

It will thus be seen that pocket separators have been provided with which the objects of the invention are attained.

I claim:

1. A pocket separator for forming cell assemblies in an electric storage battery which contains a positive or negative electrode plate which comprises:

a pocket for retaining said plate, said pocket includes an outer shell with an open top, a closed bottom and closed sides, said shell is formed of separator material, a plurality of continuous vertical ribs joined together at the side edges of said pocket, a plurality of spaced, opposed, angled ribs on each side of said pocket, spaced inwardly from said ribs, facing towards and contacting said plate and, a plurality of vertical non-continuous ribs in the middle of each of said pocket sides facing towards and in contact with said plate.

2. A pocket separator as defined in claim 1 in which:

said shell is formed of a single sheet of porous synthetic resin material.

3. A pocket separator as defined in claim 2 in which:

said synthetic resin material is polyethylene.

\* \* \* \* \*